(12) United States Patent
Tai et al.

(10) Patent No.: US 6,598,750 B2
(45) Date of Patent: Jul. 29, 2003

(54) MICROMACHINED MEMBRANE PARTICLE FILTER USING PARYLENE REINFORCEMENT

(75) Inventors: Yu-Chong Tai, Pasadena, CA (US); Xing Yang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/741,968

(22) Filed: Dec. 20, 2000

(65) Prior Publication Data

US 2001/0019029 A1 Sep. 6, 2001

Related U.S. Application Data

(62) Division of application No. 09/187,475, filed on Nov. 6, 1998.
(60) Provisional application No. 60/064,807, filed on Nov. 7, 1997.

(51) Int. Cl.⁷ .......................... B01D 67/00; B01D 71/02
(52) U.S. Cl. .................. 210/490; 210/500.26; 210/506; 216/2; 216/56
(58) Field of Search .............................. 210/490, 500.23, 210/500.26, 506, 500.24; 216/56, 83, 95, 96, 99, 2; 427/244

(56) References Cited

U.S. PATENT DOCUMENTS

| | | | | |
|---|---|---|---|---|
| 3,562,608 A | * | 2/1971 | Gallagher et al. | |
| 4,751,005 A | * | 6/1988 | Mitsui et al. | |
| 5,067,491 A | * | 11/1991 | Taylor, II et al. | |
| 5,141,596 A | * | 8/1992 | Hawkins et al. | |
| 5,609,629 A | | 3/1997 | Fearnot et al. | |
| 5,660,680 A | | 8/1997 | Keller | |
| 5,744,360 A | | 4/1998 | Hu et al. | |
| 5,753,014 A | | 5/1998 | Van Rijn | |
| 5,776,324 A | * | 7/1998 | Usala | |
| 5,964,991 A | * | 10/1999 | Kawasaki et al. | |
| 5,985,164 A | * | 11/1999 | Chu et al. | |

FOREIGN PATENT DOCUMENTS

| | | | |
|---|---|---|---|
| NL | 9401260 | * | 8/1994 |
| WO | WO95/13860 | | 5/1995 |

OTHER PUBLICATIONS

English translation of NL 9401260.*

The Condensed Chemical Dictionary, ninth edition, revised by G.G. Hawley; van Nostrand Reinhold Company (1977); p. 652.

* cited by examiner

*Primary Examiner*—W. L. Walker
*Assistant Examiner*—David Sorkin
(74) *Attorney, Agent, or Firm*—Fish & Richardson P.C.

(57) ABSTRACT

A micromachined membrane particle filter is formed by making holes in a silicon and coating over the holes with Parylene.

21 Claims, 4 Drawing Sheets

| top view (8 mm × 8mm) | cross-sectional view (thickness) | hole size $d$ (μm) or $a \times b$ (μm²) | opening factor $\beta$ (%) |
|---|---|---|---|
| ⊡ 5.3 mm | ▫ ▫ ▫ (2 μm + 2 × 1 μm) | 6 | 3.65 |
| ⊡ 2.3 mm | ▫ ▫ ▫ (2 μm) | 8 – 8.8 | 7.5 |
| ⊡ 5.3 mm | ▫ ▫ ▫ (2 μm) | 10.6 | 12.5 |
| □ | ▫ ▫ ▫ (1.1 μm + 2 × 1 μm) | 7 – 7.5 | 15.1 – 17.4 |
| □ | ▫ ▫ ▫ (1 μm) | 11 – 12 | 37.3 – 44.4 |
| □ | ▫ ▫ ▫ (1 μm) | 6 × 20 | 43.6 |
| □ | ▫ ▫ ▫ (1.1 μm + 2 × 1 μm) | 2-3 × 16-17 | 11.6 – 18.5 |

□ : non-filtering region   □ : silicon nitride
□ : filtering region       □ : parylene coating

FIG. 2

MICROMACHINED MEMBRANE PARTICLE FILTER USING PARYLENE REINFORCEMENT

This application is a divisional of U.S. application Ser. No. 09/187,475, filed Nov. 6, 1998 (pending).

This application claims the benefit of the U.S. Provisional Application No. 60/064,807, filed on Nov. 7, 1997, which is incorporated herein by reference.

STATEMENT AS TO FEDERALLY SPONSORED RESEARCH

The U.S. Government may have certain rights in this invention pursuant to Grant No. N66001-96-C-8632 awarded by the U.S. Navy.

BACKGROUND

A mechanical filter can be used to remove, filter, or collect particles. This filtering and collection of particles can be used for sampling of particles, chemical detection, and/or biological cell analysis.

It is known to make such filters using micromachining techniques to form small features in a silicon wafer. For example, this has been described in C. J. M. Van Rijin and M. C. Elwenspoek, "Micro Filtration Membrane Sieve with Silicon Micro Machining for Industrial and Biomedical Applications," Proceedings of IEEE Micro Electro Mechanical Systems Workshop (MEMS'95), pp. 83–87, 1995 and G. Kittilsland and G. Stemme, "A Submicron Particle Filter in Silicon," Sensors and Actuators, A: Physical, Vol. 23, pp. 904–907, 1990. However, the present disclosure describes a different way of developing filters which has certain improved characteristics.

One problem with prior micromachined filters is their overall strength.

SUMMARY

A membrane particle filter is described which uses micromachining technologies. The filters are fabricated using a substrate membrane that is perforated with holes. The holes can have different shapes, different dimensions, and different opening factors. Preferred shapes include circular, hexagonal, and rectangular, with dimensions ranging from 6–13 $\mu$m.

In a preferred mode, a layer of Parylene material is uniformly coated on the filters and on the inner surfaces of the holes in order to increase the overall strength of the filter.

Another important feature is the amount of power which is necessary to provide the desired pressure drop across the filter. Proper control of the opening size allows determining various tradeoffs, including the energy and power necessary to form the desired pressure drop. Another feature of this disclosure is that the sizes of the openings can be more specifically controlled by deposition of Parylene material.

BRIEF DESCRIPTION OF THE DRAWINGS

These and other aspects will now be described in detail with reference to the accompanying drawings, wherein:

FIG. 2 shows different results of different filtering regions;

DESCRIPTION OF THE PREFERRED EMBODIMENTS

The fabrication process for the preferred mode filter is shown in FIGS. 1A–1F. The process begins in FIG. 1A by depositing a layer of low stress LPCVD silicon nitride 100 and 102 ("SiN") at 850° C. on a silicon substrate 104. The layer 100 is preferably between a ½ and 1 $\mu$m micron thick. The material is deposited with an $SIH_2Cl_2:.NH_3$ gas flow ratio of 4 to 1. The SiN layers 100, 102 are deposited on both sides of silicon substrate 104.

Figure 1A:
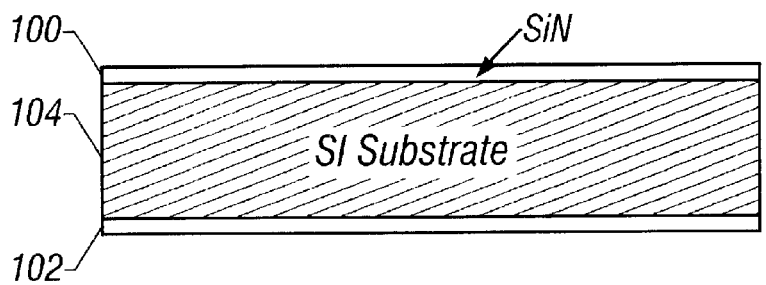
FIGS. 1A–1F show a membrane filter fabrication process.
Figure 1B:
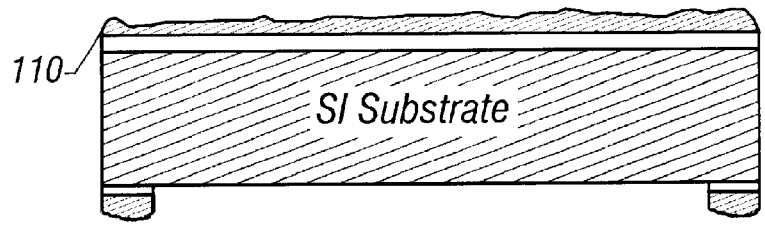

FIG. 1B shows patterning the SiN layer 102 on the backside of the silicon substrate 104. First, the desired areas to be protected are covered with photoresist layer 110. This is followed by dry etching the SiN 102 to form a pattern.

Figure 1C:
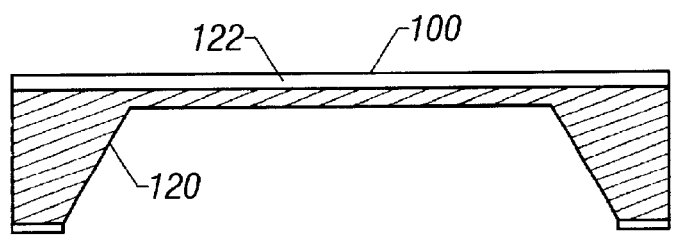

FIG. 1C shows the anisotropic etching step which uses an anisotropic etchant such as KOH. This leaves a window 120 left in the wafer, with only a thin area of the silicon wafer 122 remaining. The thin wafer area can be between 20 and 100 $\mu$m thick. The overlying silicon nitride 100 remains unchanged during this step.

Figure 1D:
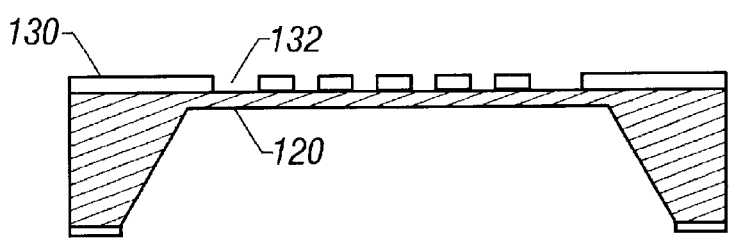
Figure 1E:
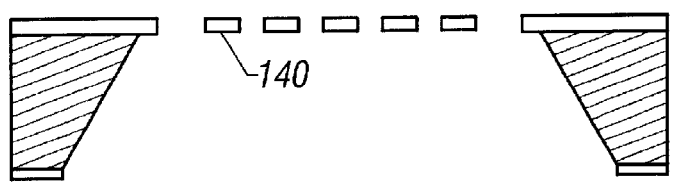
Figure 1F:
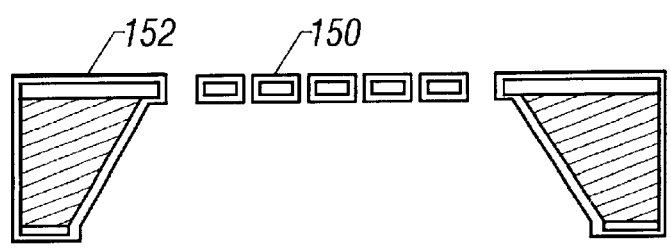

FIG. 1D shows using RIE to provide patterns 130 in the SiN layer 100. The pattern includes holes 132 into the silicon nitride layer 100. The holes can be of any desired size and shape as described above.

This is followed by placing the wafer into another anisotropic solution (for example, KOH) to remove the remaining silicon layer 120. This frees the membrane to form the unsupported membrane shown in FIG. 1E. The membrane includes unsupported silicon nitride portion 140, defining holes therebetween. These holes, however, would have low structural integrity.

Finally, a layer of Parylene is deposited over the entire wafer. Parylene is available from Specialty Coating Systems, Inc., 5707 West Minnesota Street, Indianapolis, Ind. 46241. The Parylene uniformly covers the entire wafer surface, forming Parylene overlayers 150, 152. Each of the holes therefore includes a Parylene overlayer on each of its surfaces: top surface, bottom surface, and all sides.

The layer of Parylene 150 serves three main purposes. The Parylene overlayer greatly improves the strength of the membrane filter by providing a reinforcement to the filter. Uniform deposition of Parylene also allows changing the hole size. Different hole sizes can be obtained from the same basic filter skeleton. Control of the thickness of the Parylene layer can be used to obtain these different hole sizes. For example, a 10 $\mu$m opening can be changed to a 6 $\mu$m opening by depositing 2 $\mu$m of Parylene on the entire device, forming two, 2 $\mu$m barriers at two ends of the hole. Hence, the same basic filter can have different holes sizes by changing the thickness of the Parylene layer.

Parylene is biocompatible, making the filter suitable for biological applications.

This fabrication process can be used for various membrane filters. The preferred hole shapes include circular, hexagonal, and/or rectangular. Filters as large as 8×8 square millimeters can be fabricated. The opening area ratio increases as the hole size increases. The hole size also defines the filtering threshold—the minimum size of the particles that can be blocked by the filter.

For example, a filter with a 10.6 $\mu$m diameter hole has an opening area ratio of approximately 12½%. Hexagonal holes can provide higher opening area ratios, but cause higher stress concentration in the membrane. This effectively reduces the strength of the filter. Rectangular holes can provide a large range of opening area ratio without changing the filtering threshold. One dimension of the rectangular holes must be kept constant.

Figure 3A:
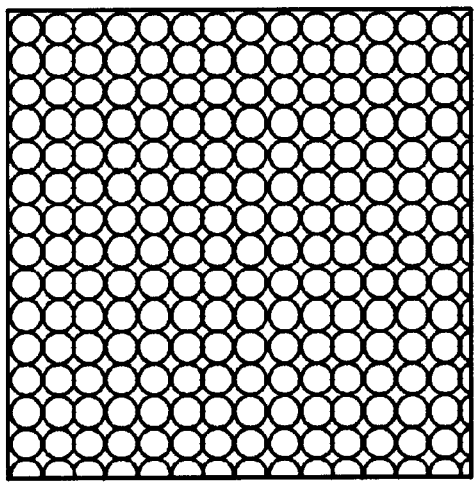
FIGS. 3A–3D show various fabricated membrane filters and their openings.
Figure 3B:
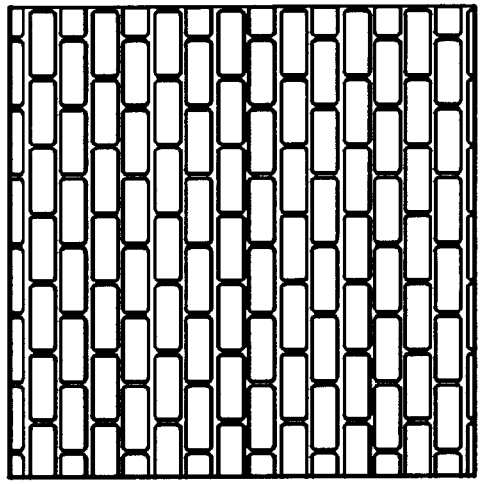
Figure 3C:
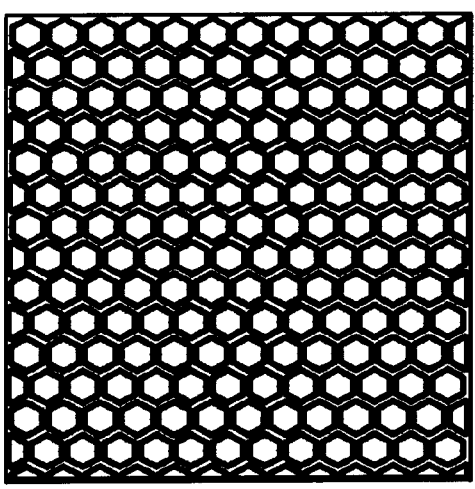
Figure 3D:
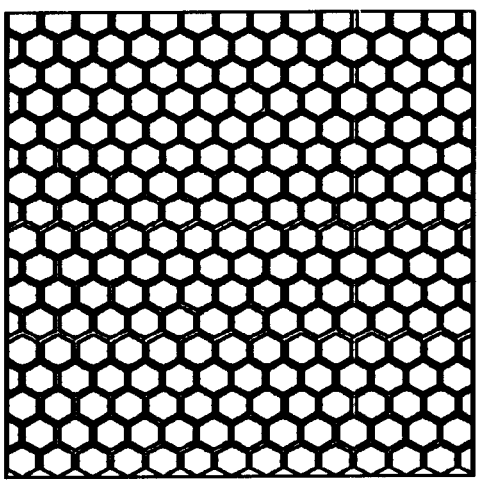

FIG. 3A shows a top view of a circular hole. FIG. 3B shows the rectangular hole, while FIGS. 3C and 3D respectively show the hexagonal holes for these filters.

FIG. 2 shows different characteristics for the filters. The far left side of the figure shows a top view of 8 millimeter×8 millimeter area. This is defined into different non-filtering regions and filtering regions.

TABLE 1 shows how the final Parylene coating layer increases the strength of the filters. Burst pressure of various membrane filters was tested using differential pneumatic pressure across the filter membrane. The first pressure of filter 6 in TABLE 1 was more than 4 times higher when coated with 2.69 microns of Parylene.

TABLE 1

Filter Strength
(Filter #6, β = 43.6%)

| Parylene Thickness ($\mu$m) | Burst Pressure (PSI) |
|---|---|
| 0 | 0.9 |
| 1.38 | 1.9 |
| 2.69 | 4.2 |

Figure 4:
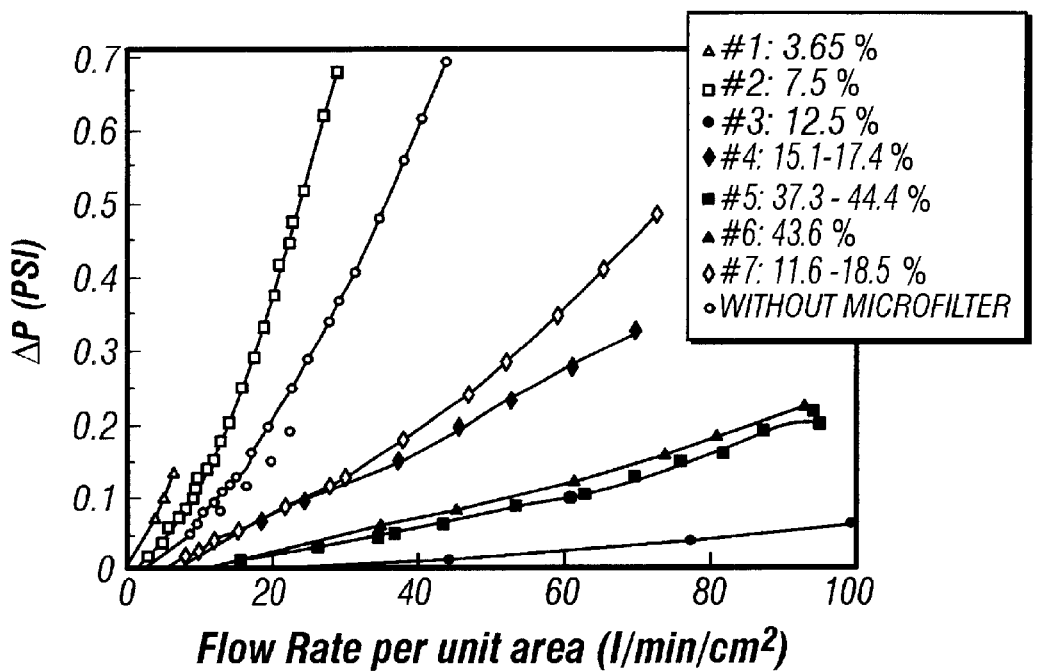
FIGS. 4 and 5 show different pressure drops as functions of the flow rate.
Figure 5:
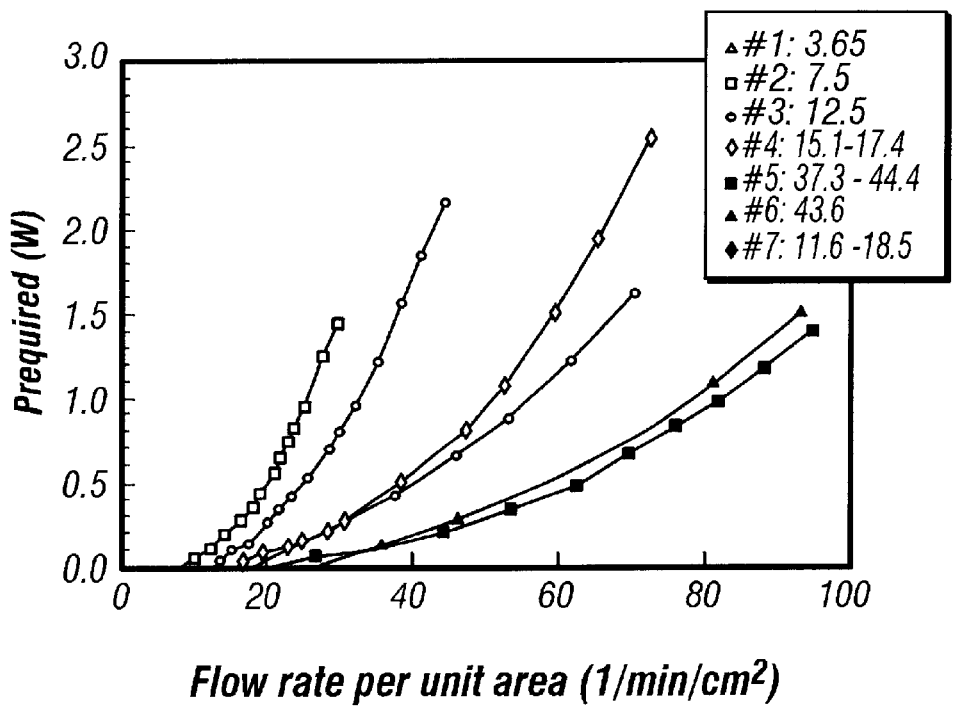

The fluid dynamic performance of the membrane filters was also tested, and the results are shown in FIGS. 4 and 5. Each of the pressure drops is a function of flow rate per unit area was fitted with a second order polynomial function. The power to sustain a desired flow rate is calculated by multiplying the pressure drop by the volumetric flow rate. Hence, these features show how the pressure drop across the microfilter and power requirement increase dramatically as the opening factor increases.

Although only a few embodiments have been disclosed in detail above, many modifications are possible in the preferred embodiment without undue experimentation.

What is claimed is:

1. A micromachined membrane filter, comprising:
   a semiconductor base layer;
   a filter border comprising a filter material layer comprising a filter material disposed on at least a portion of the base layer;
   a grid comprising the filter material, the grid connected to the filter material layer and spanning a filter area defined by the filter border, the grid defining a plurality of openings with an opening factor of between about 37.3% and about 44.4%.

2. The filter of claim 1, wherein the semiconductor base layer comprises silicon.

3. The filter of claim 1, wherein the filter material comprises silicon nitride.

4. The filter of claim 1, further comprising a coating layer on the grid, a thickness of the coating layer chosen so that the opening size is decreased to be equal to a desired filter pore size.

5. The filter of claim 4, wherein the desired filter pore size corresponds to an opening factor of between about 11.6% and about 18.5%.

6. The filter of claim 4, wherein the coating layer comprises Parylene.

7. The filter of claim 6, wherein the thickness is at least 2 $\mu$m.

8. A method of forming a micromachined particle filter, comprising:
   forming a plurality of openings in a grid area of a filter layer so that an opening factor of the grid area is between about 37.3% and about 44.4%; and
   coating edges of the openings with a thickness of an overlayer material to achieve a desired filter pore size.

9. A method as in claim 8 wherein said openings have a shape chosen from the group consisting of circular, rectangular, and hexagonal when formed.

10. A method as in claim 8 wherein said desired pore size corresponds to an opening factor ranging from about 11.6% to about 18.5%.

11. A method as in claim 8, wherein said coating comprises coating with at least 2 $\mu$m thick of Parylene.

12. A method, comprising:
    forming a first layer on a first side of a semiconductor substrate;
    etching a second side opposite the first side of the semiconductor substrate, forming a thinned area of the semiconductor substrate;
    forming openings in the first layer across a grid area so that an opening factor of the first layer across the grid area is between about 37.3% and about 44.4%; and
    substantially removing the thinned area of the semiconductor substrate beneath the grid area of the first layer.

13. A method as in claim 12, further including coating the openings with a coating material.

14. A method as in claim 12, wherein said coating material comprises Parylene.

15. A method as in claim 12, wherein said first layer includes silicon nitride.

16. A method as in claim 12, wherein said first layer is between one-half micron and one micron in thickness.

17. A method as in claim 16, wherein said semiconductor substrate includes silicon.

18. A method as in claim 12, wherein said removing comprises using an anisotropic etch.

19. A method as in claim 12, wherein said forming said openings comprises forming patterns defining openings which are between six and thirteen microns.

20. A method, comprising:
    depositing a first layer of silicon nitride of between one-half and one micron thick on a first side of a substrate including silicon;
    etching a second side opposite the first side of said substrate to form a thinned layer of substrate that is between 20 and 100 microns in width, supporting said silicon nitride first layer;
    forming openings in said silicon nitride first layer over a grid area so that an opening factor of the first layer across the grid area is between about 37.3% and about 44.4%, and wherein said openings are larger than a desired final filter pore size; and
    removing said thinned layer of substrate at least beneath the grid area.

21. The method of claim 20, further comprising coating said openings with a biocompatible material to form filter pores of the desired final filter pore size.

* * * * *